US005614332A

United States Patent [19]
Pavelle et al.

[11] Patent Number: 5,614,332
[45] Date of Patent: Mar. 25, 1997

[54] METHOD AND APPARATUS FOR INCREASING CHARGING AND DISCHARGING EFFICIENCY IN BATTERIES

[76] Inventors: Richard Pavelle, 23 Berkshire Dr.; Ronald M. Latanision, 28 Nassau Dr.; Paul Burstein, 16 Glengarry, all of Winchester, Mass. 01890

[21] Appl. No.: 692,322

[22] Filed: Aug. 5, 1996

Related U.S. Application Data

[63] Continuation of Ser. No. 452,205, May 26, 1995, abandoned.
[51] Int. Cl.$^6$ .................................................. H01M 10/46
[52] U.S. Cl. ......................... 429/68; 429/69; 429/66; 429/94; 429/50
[58] Field of Search .................................. 429/68, 69, 66, 429/94, 50, 51

[56] References Cited

U.S. PATENT DOCUMENTS

| 4,052,541 | 10/1977 | von Krusenstierna | 429/68 |
| 4,587,182 | 5/1986 | Stiles et al. | 429/94 |
| 4,968,395 | 11/1990 | Pavelle et al. | 204/130 |
| 5,114,804 | 5/1992 | Stiles et al. | 429/94 |

*Primary Examiner*—Kathryn L. Gorgos
*Assistant Examiner*—Kishor Mayekar
*Attorney, Agent, or Firm*—Sprung Horn Kramer & Woods

[57] ABSTRACT

A method and apparatus for increasing charging and discharging efficiency of a battery. A battery is provided having electrodes and an electrolyte. The electrodes are connected to a charging or discharging circuit and at least one electrode is mechanically manipulated during the charging or discharging.

22 Claims, 5 Drawing Sheets

$\Delta t_1 \ll \Delta t_2$

METHOD AND APPARATUS FOR INCREASING CHARGING AND DISCHARGING EFFICIENCY IN BATTERIES

This application is a continuation of application Ser. No. 08/452,205, filed May 26, 1995, now abandoned.

BACKGROUND OF THE INVENTION

The present invention relates to a method and apparatus for charging and discharging batteries.

U.S. Pat. No. 4,968,395 discloses the use of electrodes in catalytic processes. The main function of a catalyst is to provide a changed local structure that yields a site for a reaction to occur without the catalyst itself being consumed. The patent provides methods and apparatus for accomplishing this function, thereby increasing the overall efficiency of these processes with a minimum of manual replacement, overhaul or other method that requires removal e.g. for cleaning of the catalytic electrode from its functional environment.

SUMMARY OF THE INVENTION

The main object of the present invention is to extend these concepts of electrode manipulation to include the enhanced charging and discharging efficiency of conventional batteries. This efficiency enhancement leads to increased energy densities and a reduction of battery mass necessary to obtain the equivalent energy storage capacity of a conventional battery.

Batteries are energy storage devices. They are not normally thought of as catalytic devices although they involve electrochemical processes that are catalytic. A measure of the catalytic efficiency is the exchange current density $i_0$ for a given half cell reaction. The effect of plastic strain rate, $\dot{\epsilon}$, on the change in exchange current density, $\Delta i_0$, for the hydrogen evolution reaction is a function $$\Delta i_0 = \frac{2.83 \dot{\epsilon} l_0^2 a_0}{d} i_0$$

where $a_0$ is the length of the side on a specimen of square cross section and of initial length $l_0$ and $d$ is the spacing between active slip planes in the plastically deforming sample.

Below we shall specify in detail how the invention relates to these energy storage devices.

A conventional battery is a device, usually portable, for generating electricity through an electrochemical reaction. Such a reaction involves the transfer of electrons between two electrodes that are inserted into an ion-conducting medium, the electrolyte. The negative electrode, or anode, loses electrons; the positive electrode, or cathode, gains them. When the electrodes are connected by an external circuit to a resistive element the circuit is complete and an electric current is generated. The electrolyte is typically a liquid or paste, but solid-electrolyte batteries using conductive solids have been produced.

Batteries are typically grouped into two categories: primary and secondary. A primary battery, once expended, cannot be easily recharged although sophisticated consumer devices to charge them are now appearing on the market. Common examples of primary batteries include zinc-carbon, alkaline, and lithium types. A secondary, or storage battery, is capable of being recharged and can be reused many times. Common examples include lead-acid car batteries and nickel-cadmium batteries.

In certain electrochemical devices and processes, including batteries, the electrode is itself a catalyst. Zinc and lithium are two common electrodes. These are used for a wide variety of battery applications. The present invention, however, is directed to any type of battery and electrode and is not restricted to catalytic electrodes.

It is well known that the total surface area and/or volume, occlusive capacity, and the local physical properties of the electrodes partially determine the charging and discharging rates. These factors can be affected drastically by the detailed preparation and maintenance of the electrodes. For example, in certain battery reactions, milled or extruded electrodes may not function in the same manner as do cast or surface-toughened electrodes made of identical material. This can be caused by impurities that find their way, deliberately or inadvertently, into the battery electrode during the manufacturing process. Moreover, the various electrochemical processes involving these electrodes can also render the electrodes less efficient as the charging and discharging processes continue. In a lead acid battery, two lead plates are used as electrodes in a sulfuric acid electrolyte. During charging

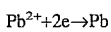

at the cathode. At the anode $Pb^{2+}$ ions in solution are oxidized forming $PbO_2$ that deposits on the plate

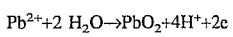

During discharge the reverse reactions occur.

In a lead acid battery, one electrode is lead, the other lead oxide. After a number of years in regular use, built-up contaminants in the lead electrode renders the battery far less efficient than it would otherwise be.

To this point, those knowledgeable in the field have not attempted to manipulate battery electrodes in order to increase their charging and discharging efficiency. Another object of the present invention is to provide methods, and apparatus for accomplishing this function, thereby increasing the overall efficiency of these devices.

The purpose of electrode manipulation is to extend or enhance the initial efficiency provided by the electrode in order to nullify the degrading effects of the process or the electrode's preparation. This manipulation also affects the mobility of the reactants in the electrode's lattice and at its surface. For example, it is known that the electrode surface character changes with time, depending upon the process. The methods and apparatus described herein are primarily mechanical and electromagnetic in nature. The aim of these methods is to continuously expose fresh electrode surface to the electrolyte.

The mechanical methods include compression, tension and torque, shock, and acoustic wave generation. These can be applied in either static or dynamic (time varying) mode, as discussed hereinafter. Other methods such as electromagnetic pulses (e.g., plasma arc) and laser activation at the surface of the battery electrode are also within the scope of the invention.

These and other features and advantages of the present invention will be described in more detail hereinafter with respect to the attached drawings wherein:

DETAILED DESCRIPTION OF THE INVENTION

Figure 1:
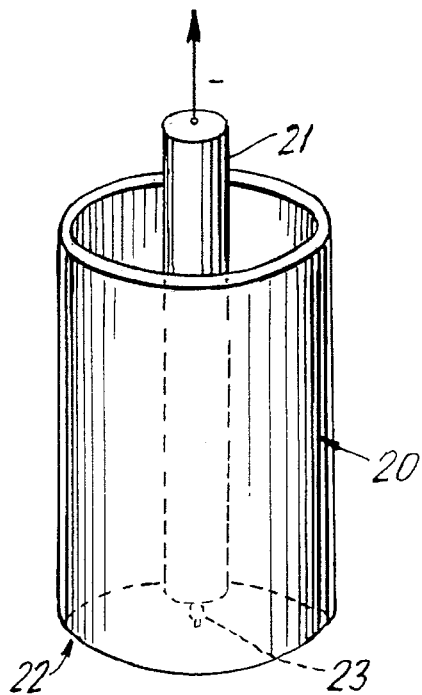
FIGS. 1–4 illustrate different configurations of battery electrodes in accordance with the invention.

A volume phenomenon is illustrated in FIG. 1. This implementation involves packing a battery electrode 21 in powdered state into a hollow form, e.g., a cylinder 20 (which, in this case, forms the second electrode) or the like, the object being that the reactant flow through the interstitial spaces in the cylinder. The fastener, 23, holds the electrode in place as it is being stressed, e.g., in tension. This clearly provides a porous access to the electrode, thus still allowing the flow of reactants. This configuration maximizes the surface area presented by the electrode but does not provide a tight molecular binding/orientation. The use of a conductive dopant may be necessary in this configuration, if the powder itself is not a good electrical conductor. The actual chemical doping of the battery electrode can be accomplished during its manufacture, prior to its integration into the battery cell.

Other embodiments also apply where the reaction occurs within a volume, e.g., the absorption of a gas or plasma by a crystalline structure. In this case, diffusion of the reactants into the battery electrode must proceed at a minimum rate for a threshold yield. Physical alignments (of a crystal structure, for example) or the application of pressure can be critical, because deformation of the electrode structure may enhance the reaction rate enormously. A lattice can be deformed by application of such a perturbation to cause a deformation in the otherwise regular crystal structure of the battery electrode. This type of distortion can propagate throughout the volume and enhance the diffusion and reaction rates of the process. The introduction of these forces leads to this type of desirable phenomenon.

The use of this embodiment may decrease the temperature of an existing high temperature mode by spreading the current over a larger area, while maintaining electric potentials.

Two other classes of configurations, one based on foils, the second based on assemblies of thin tubes or cylinders or the like provide the basis for relatively large and inexpensive catalysts.

Figure 2:
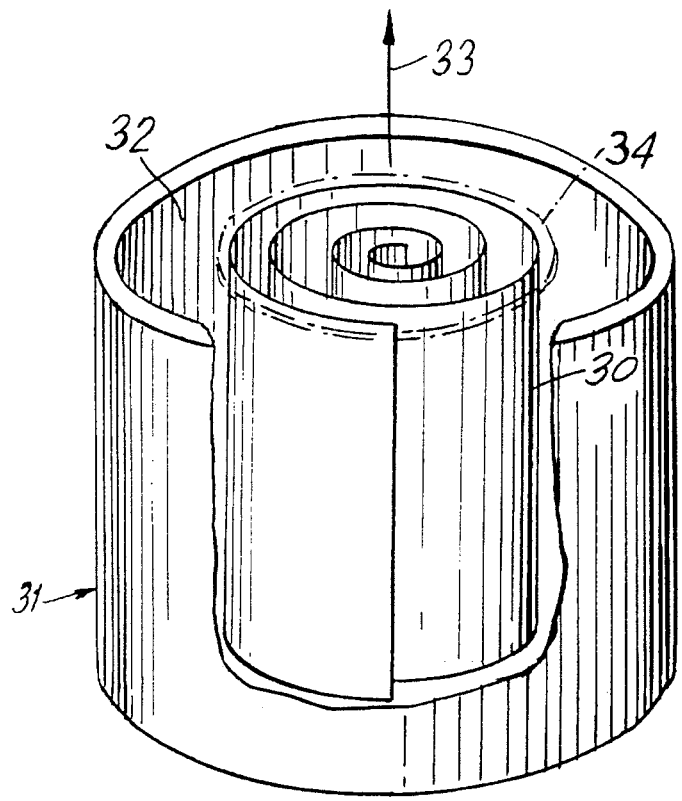

The advantage of the foil based configurations is that they are easily formed from available stock through elementary metal-forming processes. For example, rolls of metal stock, 0.001–0.010 inch thick, can be readily formed into a cylindrical spiral that is shown as electrode 30 (see FIG. 2). The tightness of the spiral determines the amount of surface area available to the reactants. In FIG. 2, the second electrode is shown as the case of the battery. The electrode fills the space 32. Stress 33 is applied by a plate 34, which is shown in the figure as tension. Compression could be shown in similar fashion. Similarly, the wave-like configuration 40 of FIG. 3 will also yield high surface area in a minimum volume. This configuration is also easily formed with conventional materials and standard metallurgical techniques. (In FIG. 3, only one electrode 40 is shown. The second electrode is typically part of the battery wall. Stress is applied at 41 either through tension or compression.

Figure 4:
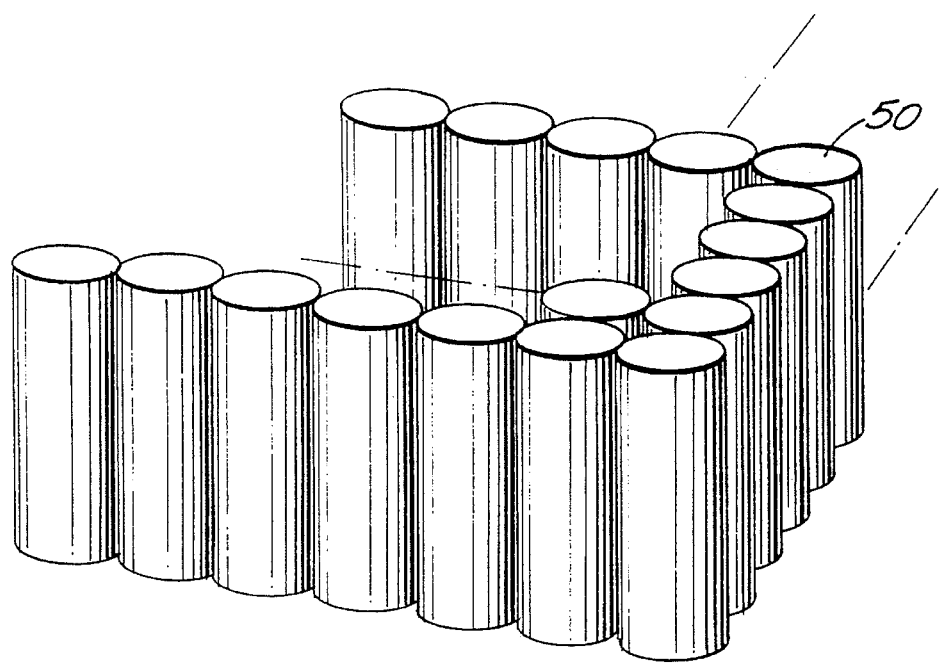

The second class of configurations is based on a modular array of tubular building blocks 50, whose surfaces may be rectangular or round or any convenient cross section as shown FIG. 4. These structures may be solid or hollow which allows heat to be extracted or dissipated by passing a fluid through the center. Again, in FIG. 4, only one of the electrodes is shown.

Figure 5:
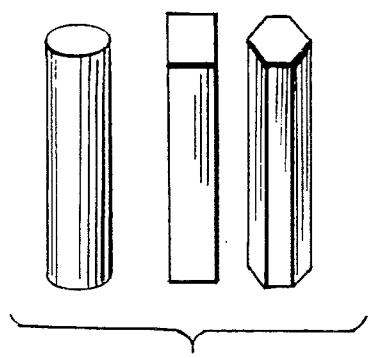
FIGS. 5–15 illustrate alternative embodiments for manipulating electrodes in accordance with the invention.
Figure 3:
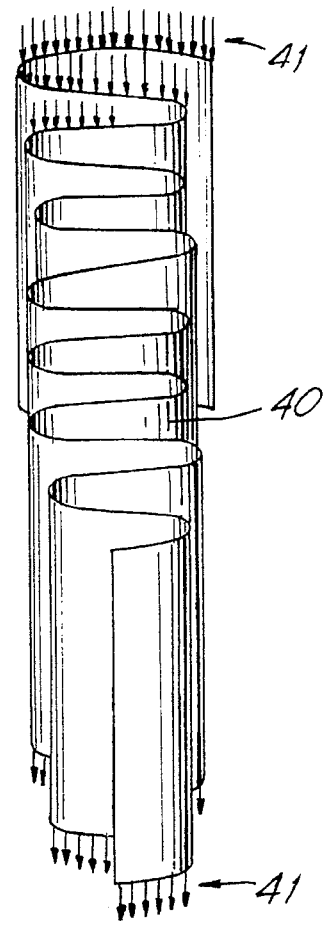

The structures of FIGS. 3 and 5 can also be used as modules in superstructures that follow the pattern of FIG. 4.

Compression can be delivered to the battery electrode via direct mechanical means or by coupling through a medium. The purpose of the compression is to exert stress on the micro structure of the battery electrode thereby either breaking local bonds that inhibit the desired reaction, or to produce a local strain in the lattice that may favor a process which is otherwise sub-critical. A preferred means of compression is via hydraulic pressure directly on the electrodes. This method allows precise force to be applied to the electrode. Either of two configurations will suffice: (1) the battery electrode protrudes from the electrolytic solution and the compressive force is applied outside the solution or (2) the compression element is immersed in the electrolyte, and the compressive force is applied within it.

This method favors structures that can support the compression without significant mechanical deformation, e.g., the tube structure of FIG. 4. Clearly, this mechanism can absorb far more compression without macroscopic deformation than an apparatus built around a structure like that in FIG. 3. If properly designed, such tubular structures can be built to withstand pressures in excess of 100 atmospheres, as seen in honeycomb structures commonly used in aircraft components.

Figure 6:
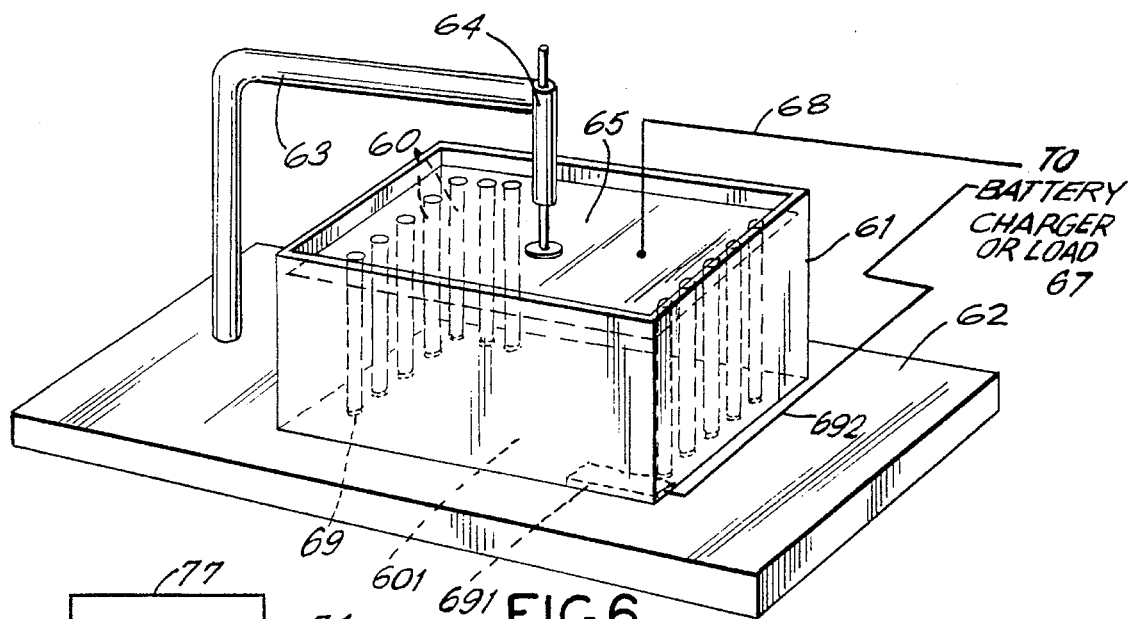

FIG. 6 shows a complete configuration utilizing hydraulic pressure to compress an array of battery electrode tubes shown seen in FIG. 4. A containment vessel 61 is positioned on a rigid base 62, with a rigid arm 63 which supports a hydraulic piston 64. The containment vessel is filled with electrolyte, 601.

The piston is attached to but electrically insulated from the conductive plate 65, through which pressure is applied to a battery electrode array 60. A conductor 68 is affixed to the plate 65 providing means of attachment to a charging source 67. The bottoms of the tubes 69 are electrically insulated from the floor of the containment vessel. The second electrode 691 is the bottom of the containment vessel, which is attached to an insulated wire 692 that runs through the containment vessel wall to the battery charger 67. During discharge, the battery charger 67 is removed and a load attached at 68.

Figure 7:
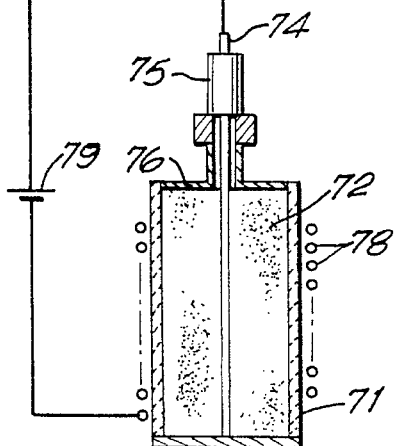

Another example is the powdered configuration in a hollow form, where a ram acting as a control rod can be used to apply pressure to the electrode directly, thereby controlling the reaction rate. Far greater pressure can be applied in this case, perhaps as much as 1000 atmospheres for large-scale structures. FIG. 7 presents a simplified cut-away view of such a configuration. The electrode assembly 70, consisting of a ceramic cylinder 71, is filled with powdered battery material 72. A base plate 73 is attached to a rod 74 which penetrates through the powdered material. The purpose of the rod is to provide a tension affixment point for traveling plate 76 and held in position by hydraulic piston 75 at a predetermined pressure. The rod 74 is connected via conductor 77 to charging source 79, which is also connected to a second electrode 78.

Figure 8:
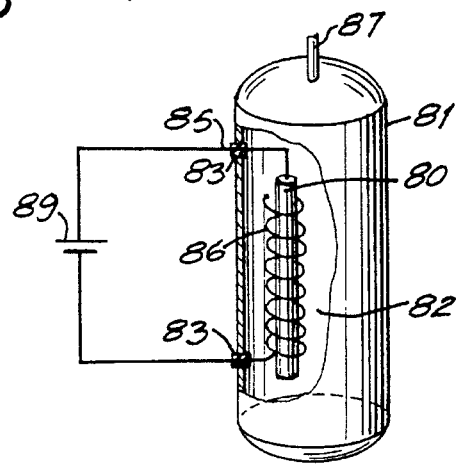

The battery solution itself can be pressurized externally and the hydrostatic pressure employed to serve the compression function. This method can be used to a pressure of 100 atmospheres without serious difficulty. This is a particularly effective embodiment, since the solution serves two purposes simultaneously, as shown in FIG. 8. The vessel in the form of a cylinder 81 containing a solution 82 is pressurized through inlet valve 87. Battery electrode 80 is suspended in the solution by means of conductor 85, which is surrounded by (but not touching) another electrode 86. The conductors are inserted through the wall of the pressure vessel via pressure seals 83 and connected to opposite poles of a charging source 89 (in the case of charging) or the load (in the case of discharging).

As was shown in FIG. 1, tension can be applied by flexing the ends of the battery electrode to plates or the like which can then be pulled apart and/or twisted with specified force or frequency. Tension and torque can be applied to specimen configurations that include both foils and assemblies of thin tubes or cylinders as discussed previously. A magnitude of 1 minute of arc (angular measure) in displacement of top and bottom could easily be carried out; deformations of 1 degree, even for the longest of tubes, appear to be the outer limit for this technique.

Figure 9:
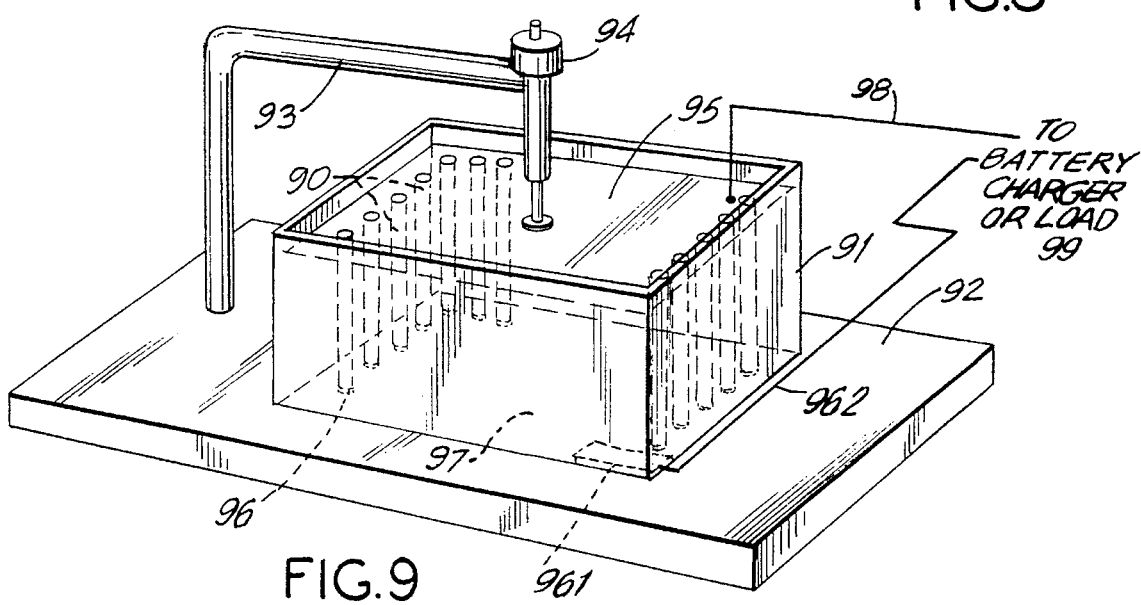

FIG. 9 shows a complete configuration utilizing hydraulic pressure to pull an array of battery electrode tubes 90 as originally seen in FIG. 6. The electrode tubes are rigidly fastened to top and bottom plates 95 and 97. A containment vessel 91 is positioned on a rigid base 92, with a rigid arm 93 which supports a hydraulic piston 94 whose force direction is up, away from the vessel. The piston is attached to but electrically insulated from the top plate 95, through which tension is applied to the battery electrode array 99. A conductor 98 is affixed to the plate 95 providing means of attachment to a charging source 99. The second battery electrode is constructed analogously to that of FIG. 6. The bottom of the tubes 96 are electrically insulated from the floor of the containment vessel. The second electrode 961 is the bottom of the containment vessel which consists of a metal plate, to which is affixed an insulated wire 962 that runs through the containment vessel wall to the battery charger or load 99.

Figure 10:
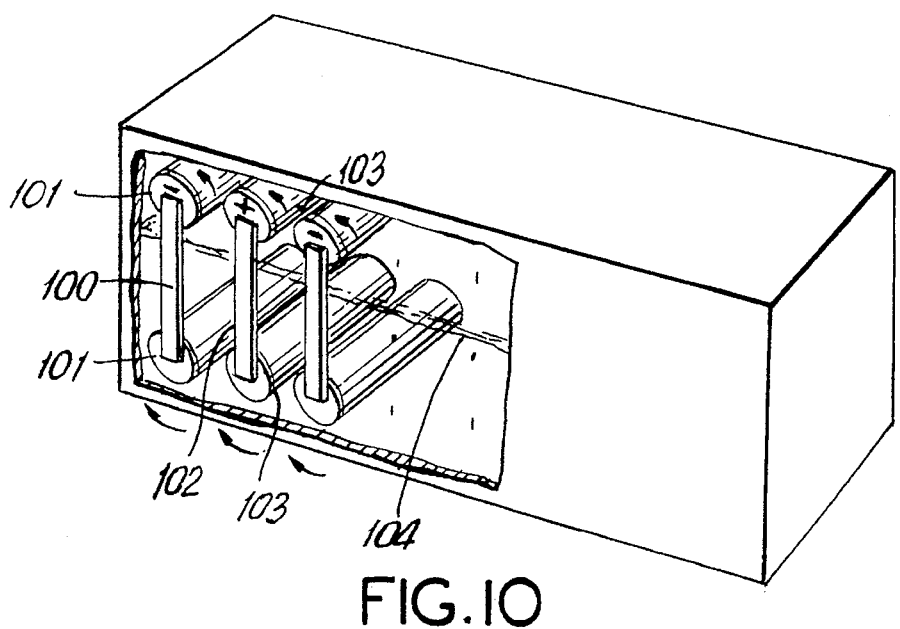

FIG. 10 shows a configuration which employs lead and lead oxide plates 100, arranged in a conventional manner in an electrolytic bath (e.g., sulfuric acid) 104. Plate 100 is a lead plate, plate 101 is a lead oxide plate, alternating plates are attached to negative and positive terminals. These plates can be subjected to a bending torque as shown in the figure. The plates are held by insulating, slotted cylinders 101 to which rotation torque can be applied about each cylinder axis. The resulting force on the plates is a bending moment.

The purpose of a shock wave in the battery electrode is to provide the same enhancement of charging and discharging efficiency as compression or tension. However, the shorter the time scale over which the shock is delivered results in larger instantaneous forces imparted to the structure of the battery electrode and this may enhance further the overall efficiency.

Figure 11:
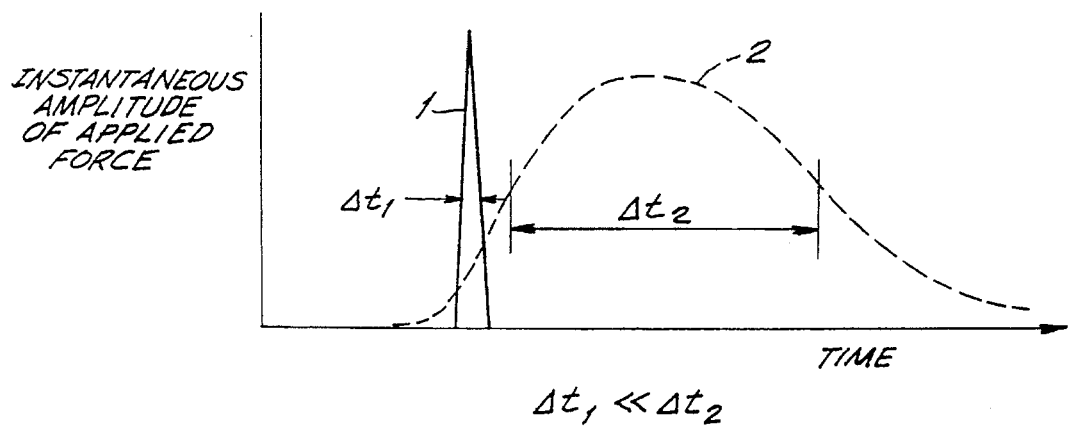

Another purpose of the shock (or any of the other time varying techniques of dynamic manipulation) is to induce a wave or series of waves of adjustable amplitudes and frequencies that will help to expose fresh electrode surface to the electrolyte. Thus, physical devices that can deliver sharp impulse functions as shown in FIG. 11 are to be preferred to those that operate in more limited frequency ranges. In most material, the velocities (both shear and longitudinal) vary between $10^5$ to $10^6$ cm/sec. The approach utilizes the differential velocity between instantaneous amplitudes of the different frequency components so that opposite forces can be generated within spatial scales. This small and local destructive interference within the battery electrode can be tailored to the desired spatial scale. It is noted that single frequencies are impractical for achieving disruptions on the spatial scale, since frequencies on the order of $10^{10}$ or $10^{11}$ cycles per second would be required. Thus, for spatial scales measured in angstroms or hundreds of angstroms and the aforementioned velocities, the preferred frequency is on the order of 50 KHz for a battery electrode of characteristic length 10 cm; at the same time, a nominal bandwidth of sufficient width must be maintained about that central frequency so that the inter frequency force differences result in local lattice deformation. The frequency scales inversely with the battery electrode size. Thus, a 100 cm long battery electrode would require a 5 KHz minimum frequency. Much smaller frequencies result in uniform displacements of the battery electrode, and so there is no differential force. To the extent that periodicities in the applied signal and reflections from the boundaries of the battery electrodes and their holding structures fixtures exist, resonances can be made to occur. These resonances result in tremendous local forces and displacements which may or may not be beneficial to the particular battery process. By varying the applied frequency spectrum and the duty cycle, the position and magnitude of this resonance can be changed. Thus, the resonance could be made to follow a predetermined periodic path through the battery electrode.

Figure 12:
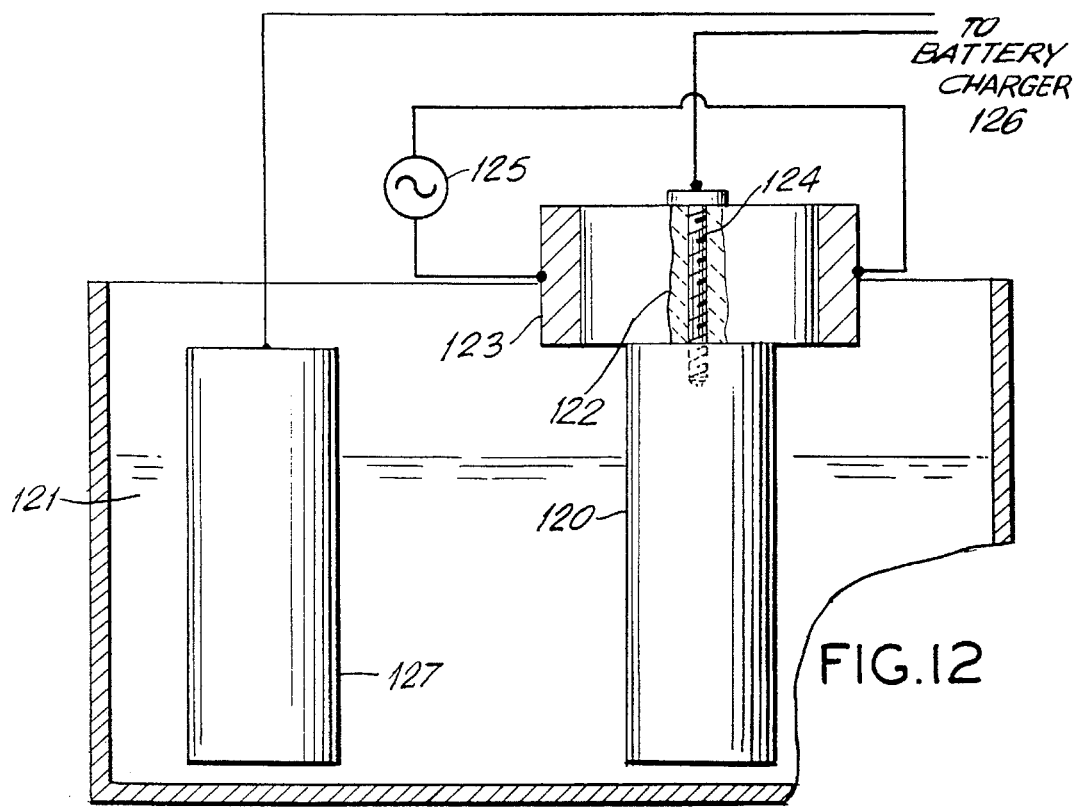

A mechanical impulse may be imparted by a device as simple as a pneumatic tool such as an air hammer, or as sophisticated as an external piezoelectric crystal electrically insulated from the battery electrode. Frequencies for the pneumatic approach might be as high as $10^4$ cycles per second, while the piezoelectric approach offers the possibility of megahertz excitations. FIG. 12 shows a simplified view of a battery electrode 120 as being driven by a piezoelectric transducer. The transducer consists of a ceramic body 122 and two conducting plates 123. The conducting plates are connected to a signal generator 125 and to the battery electrode by means of a screw 124. While this screw is shown, this connection is not necessary. The entire electrode is immersed in an electrolyte 121, and another electrode 127 completes the battery.

Shock can also be imparted via acoustic devices, but the coupling medium often required by such acoustic sources lengthens the time-scale over which the shock is applied. This increase in time results in a much smaller instantaneous magnitude for the applied force.

The purpose of acoustic methods (or any of the other time varying techniques of dynamic manipulation) is to induce a wave or series of waves of adjustable amplitudes and frequencies that will help to expose fresh electrode surface to the electrolyte. What normally distinguishes acoustic methods from other more direct mechanical methods is the need for a medium to couple the transducer to the specimen. In particular, acoustic transducers may be attached to any of the heretofore mentioned embodiments both internal and external to the electrolyte to effect this transfer of acoustic energy into the structure of the battery electrode.

Acoustic transducers are especially amenable to variable amplitude, frequency, and pulse shaping. Thus, the acoustic pulses can be tailored to the specific shape and configuration of the battery electrode. This approach can be used to exploit natural resonances of the electrode or its micro structures.

Figure 13:
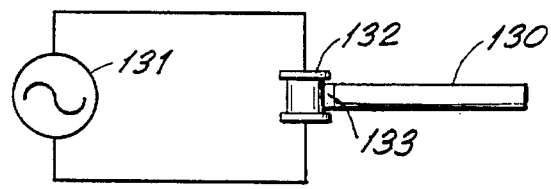

FIG. 13 shows an ultrasonic transducer 132 which is coupled to the battery electrode 130 by means of the coupling-medium 133, typically a commercial gel made expressly for this purpose. The transducer is of a type similar to, for example, Picker type 595516D which can operate at frequencies as high as 2 MHz. The transducer is driven by a commercial signal generator 131, e.g., Wavetek or Hewlett Packard, whose output is typically routed to the transducer by means of a coaxial UHF cable. Such a battery electrode could be effectively utilized as a component electrode in any battery where time varying characteristics need to be customized, e.g., in the battery cell of FIG. 12 as a substitute for the strained electrode 120 audits stress driver.

Figure 14:
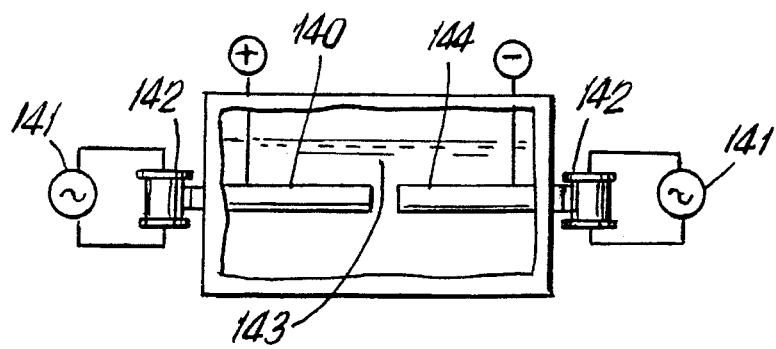

FIG. 14 shows a battery where both electrodes are stressed. The electrodes 140 and 144 are immersed in the electrolyte 143. Each electrode is strained by the acoustic generators 142, which are driven by the commercial signal generator 141. While the particular strain induction is via the ultrasonic transducer of FIG. 13, any of the aforementioned strain induction mechanisms is appropriate.

Figure 15:
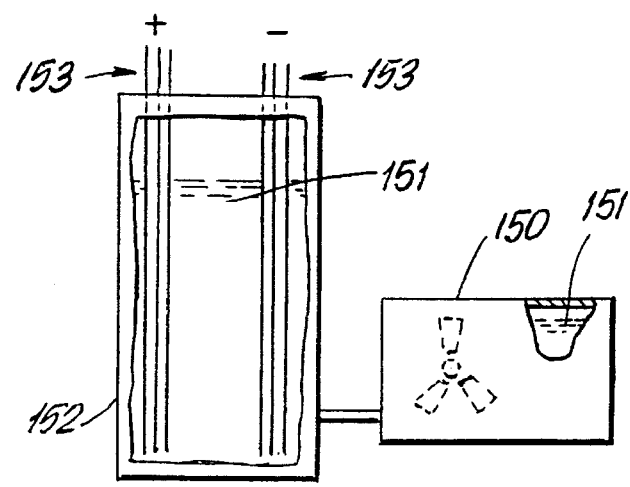

Chemically desirable crystal defects in local structure can be introduced by the application of intense radiation. This can be in the form of bombardment by X and gamma rays, neutrons, or, in the case of very thin battery electrodes, electrons. The advantage for this type of approach is the continuous non-contact nature of the radiation. No local mechanical stress need be applied. Thus, the radiation method can be utilized with very thin-walled or otherwise physically delicate battery electrodes. A typical configuration would involve placing such a electrolytic cell near a gamma ray producer. Large installations could employ an onsite reactor to produce high doses of these radiations. Typical dose rates of 1–100 megarads can disrupt the local crystal structure, and lead to embrittlement and fatigue-like symptoms of the battery electrode. In FIG. 15, a radiation source 150 is used to dope an electrolyte 151 which is pumped through the battery 152. The electrolyte carries the radioactive material, which should not interfere with the electrolytic properties of the battery, but should affect only the electrodes 153.

Any of these methods can be applied simultaneously or in series with any of the other methods. Moreover, the frequency of application can also be varied at will. This multi-dimensional approach obviates the difficulties posed by the limits of any single method. For example, the combination of tension and torque may be made cyclic on timescales ranging from milliseconds to minutes. Piezoelectric approaches can be varied on time scales of microseconds.

Certain electrochemical battery processes may be inhibited by the formation of undesired products of reaction such as gas bubbles, surface films, adsorbed impurities, etc. These may be found on either of the electrode surfaces. If the electrode of opposite polarity is properly constructed, these same methods may be applied to promote the release of these undesired products.

It will be appreciated that the instant specification and claims are set forth by way of illustration and not limitation, and that various modifications and changes may be made without departing from the spirit and scope of the present invention.

What is claimed is:

1. An apparatus comprising: a chargeable and dischargeable battery including electrodes and an electrolyte and means for mechanically manipulating at least one of the electrodes to plastically deform same to increase the charging and discharging efficiency thereof.

2. The apparatus according to claim 1, wherein the means for manipulating comprises means for applying a static force.

3. The apparatus according to claim 1, wherein the means for manipulating comprises means for applying a dynamic time-varying force.

4. The apparatus according to claim 1, wherein the means for manipulating comprises means for applying a compressing force on at least one of the electrodes.

5. The apparatus according to claim 1, wherein the means for manipulating comprises means for applying a torquing force on at least one of the electrodes.

6. The apparatus according to claim 1, wherein the means for manipulating comprises means for applying a tension force to at least one of the electrodes.

7. The apparatus according to claim 1, wherein the means for manipulating comprises means for applying an acoustic wave to at least one of the electrodes.

8. The apparatus according to claim 1, wherein the means for manipulating comprises means for applying a shock wave to at least one of the electrodes.

9. The apparatus according to claim 1, wherein at least one of the electrodes comprises a sheet with a spiral cross-section.

10. The apparatus according to claim 1, wherein at least one of the electrodes comprises a sheet with a sinusoidal cross-section.

11. The apparatus according to claim 1, wherein the electrodes comprise a plurality of parallel tubular members.

12. A method for increasing charging and discharging efficiency of a battery, comprising the steps of: providing a battery having electrodes and an electrolyte; connecting the electrodes to a charging or discharging circuit; and mechanically manipulating at least one of the electrodes to plastically deform same during charging or discharging.

13. The method according to claim 12, wherein the step of manipulating comprises applying a static force.

14. The method according to claim 12, wherein the step of manipulating comprises applying a dynamic time-varying force.

15. The method according to claim 12, wherein the step of manipulating comprises applying a force by compressing the at least one of the electrodes.

16. The method according to claim 12, wherein the step of manipulating comprises applying a force by torquing the at least one of the electrodes.

17. The method according to claim 12, wherein the step of manipulating comprises applying a force by applying tension to the at least one of the electrodes.

18. The method according to claim 12, wherein the step of manipulating comprises applying a force to the at least one of the electrodes with an acoustic wave.

19. The method according to claim 12, wherein the step of manipulating comprises applying a force to the at least one of the electrodes with a shock wave.

20. The method according to claim 12, wherein at least one of the electrodes comprises a sheet with a spiral cross-section.

21. The method according to claim 12, wherein at least one of the electrodes comprises a sheet with a sinusoidal cross-section.

22. The method according to claim 12, wherein the electrodes comprise a plurality of parallel tubular members.

* * * * *